United States Patent
McCulloch (10) Patent No.: US 7,753,629 B1
(45) Date of Patent: Jul. 13, 2010

(54) TILT TABLE

(76) Inventor: Joseph W. McCulloch, 1139 Runville Rd., Bellefonte, PA (US) 16823

( * ) Notice: Subject to any disclaimer, the term of this patent is extended or adjusted under 35 U.S.C. 154(b) by 495 days.

(21) Appl. No.: 11/162,214

(22) Filed: Sep. 1, 2005

Related U.S. Application Data (60) Provisional application No. 60/522,230, filed on Sep. 3, 2004.

(51) Int. Cl.
 *B23C 1/14* (2006.01)
(52) U.S. Cl. .................. 409/224; 409/168; 408/89; 269/60; 74/490.07; 108/7; 108/8; 33/537; 33/538
(58) Field of Classification Search .................. 409/162, 409/164, 165, 168, 174, 221, 224, 225, 219, 409/201, 211, 216; 408/89; 269/57, 58, 269/60; 901/19, 41; 74/479.01, 490.01, 74/490.03, 490.07, 490.08; 33/536, 538, 33/537; 108/7–8; 451/414
See application file for complete search history.

(56) References Cited

U.S. PATENT DOCUMENTS

| | | | | | |
|---|---|---|---|---|---|
| 252,063 | A | * | 1/1882 | Taplin | 451/414 |
| 1,364,266 | A | * | 1/1921 | Fletcher | 451/414 |
| 2,351,773 | A | * | 6/1944 | Lovenston | 33/537 |
| 2,645,026 | A | * | 7/1953 | Trbojevich | 33/536 |
| 2,771,821 | A | * | 11/1956 | Beusch | 269/59 |
| 2,869,242 | A | * | 1/1959 | Dwyer | 33/538 |
| 2,871,768 | A | * | 2/1959 | Froberg, Jr. | 269/59 |
| 3,039,766 | A | * | 6/1962 | Aronson | 269/61 |
| 3,195,238 | A | * | 7/1965 | Grenell | 33/538 |
| 3,700,228 | A | * | 10/1972 | Peale | 269/61 |
| 4,228,618 | A | * | 10/1980 | Jensen | 451/414 |
| 4,417,843 | A | * | 11/1983 | Bonga | 414/676 |
| 4,462,579 | A | * | 7/1984 | Satake | 108/7 |
| 4,767,109 | A | * | 8/1988 | Raketich | 269/61 |
| 4,819,496 | A | * | 4/1989 | Shelef | 74/490.03 |
| 5,388,935 | A | * | 2/1995 | Sheldon | 409/201 |
| 5,556,242 | A | * | 9/1996 | Sheldon et al. | 409/132 |
| 5,715,729 | A | * | 2/1998 | Toyama et al. | 74/490.03 |
| 5,787,758 | A | * | 8/1998 | Sheldon | 74/490.07 |
| 6,839,954 | B2 | * | 1/2005 | Gunstone | 29/563 |
| 2003/0129035 | A1 | * | 7/2003 | Schworer et al. | 409/168 |
| 2003/0182782 | A1 | * | 10/2003 | Hessbruggen et al. | 29/27 C |

* cited by examiner

*Primary Examiner*—Erica E Cadugan
(74) *Attorney, Agent, or Firm*—John J. Elnitski, Jr.

(57) ABSTRACT

A tilt table for use with a milling machine. The tilt table includes at least one pivot support attachable to the milling machine. The tilt table includes a table top pivotally attached to the at least one pivot support. The table top has two ends. The tilt table includes at least one movement assembly attached to at least one end of the table top to move the table top about the at least one pivot support.

19 Claims, 12 Drawing Sheets

TILT TABLE

This application claims the benefit of U.S. Provisional Application No. 60/522,230, filed Sep. 3, 2004.

BACKGROUND

The present invention generally relates to computer controlled machining on computer controlled milling machines. More specifically, the present invention relates to tilt tables used in the machining of parts on computer controlled milling machines.

The use of tilt tables in the machining of parts is not new to the industry. Tilt tables allow mill operators to produce parts of greater complexity. Tilt tables allow the addition of a fourth and fifth axis capability to machine tools that only support three axes of motion. Tilt tables may be combined with other fixtures such as a rotary table to produce complex parts with relative ease. The current state of the art of tilt tables places an angle control device, usually a worm and ring gear actuated by a servo motor, at the center or pivot axis of the tilt table. The industry has been somewhat limited in the precision of the part being machined due to the lack of stability of the current tilt tables from movement during the machining of a part. During machining, current tilt tables develop lash or free play and the tilt table becomes inaccurate due to the angle control device mechanics and the angle control device position along the table. This inaccuracy is multiplied by the length of the table being tilted. As technology moves forward the demand for greater precision in the machining of parts will increase. Greater precision in the machining parts using a tilt table requires improved stability under the stress of machining and improved control of the tilt angle of the tilt table and repeatability of the tilt angle.

It is an object of the present invention to provide an improved tilt table.

SUMMARY OF THE INVENTION

A tilt table for use with a milling machine. The tilt table includes at least one pivot support attachable to the milling machine. The tilt table includes a table top pivotally attached to the at least one pivot support. The table top has two ends. The tilt table includes at least one movement assembly attached to at least one end of the table top to move the table top about the at least one pivot support.

DETAILED DESCRIPTION

Figure 1:
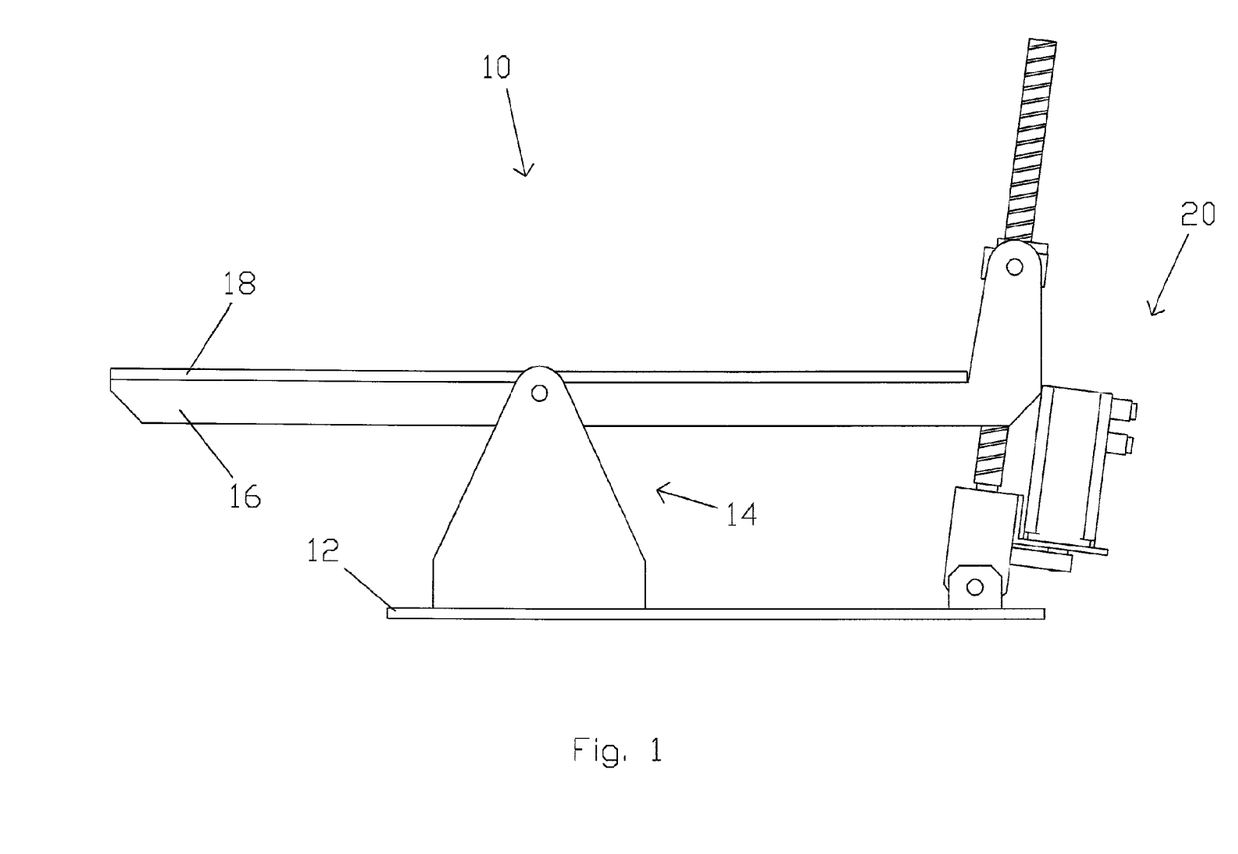
FIG. 1 is a side view of a tilt table according to the present invention.
Figure 2:
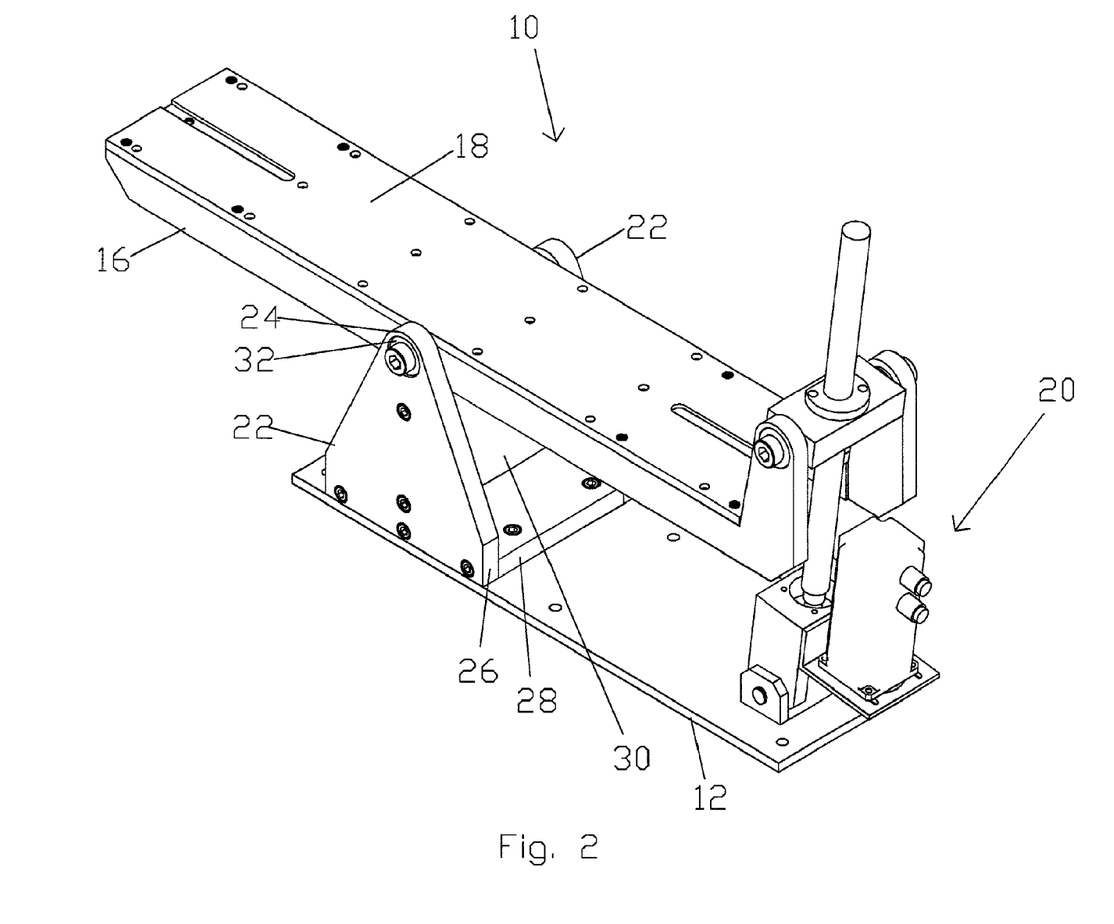
FIG. 2 is a perspective view of a tilt table according to the present invention.
Figure 3:
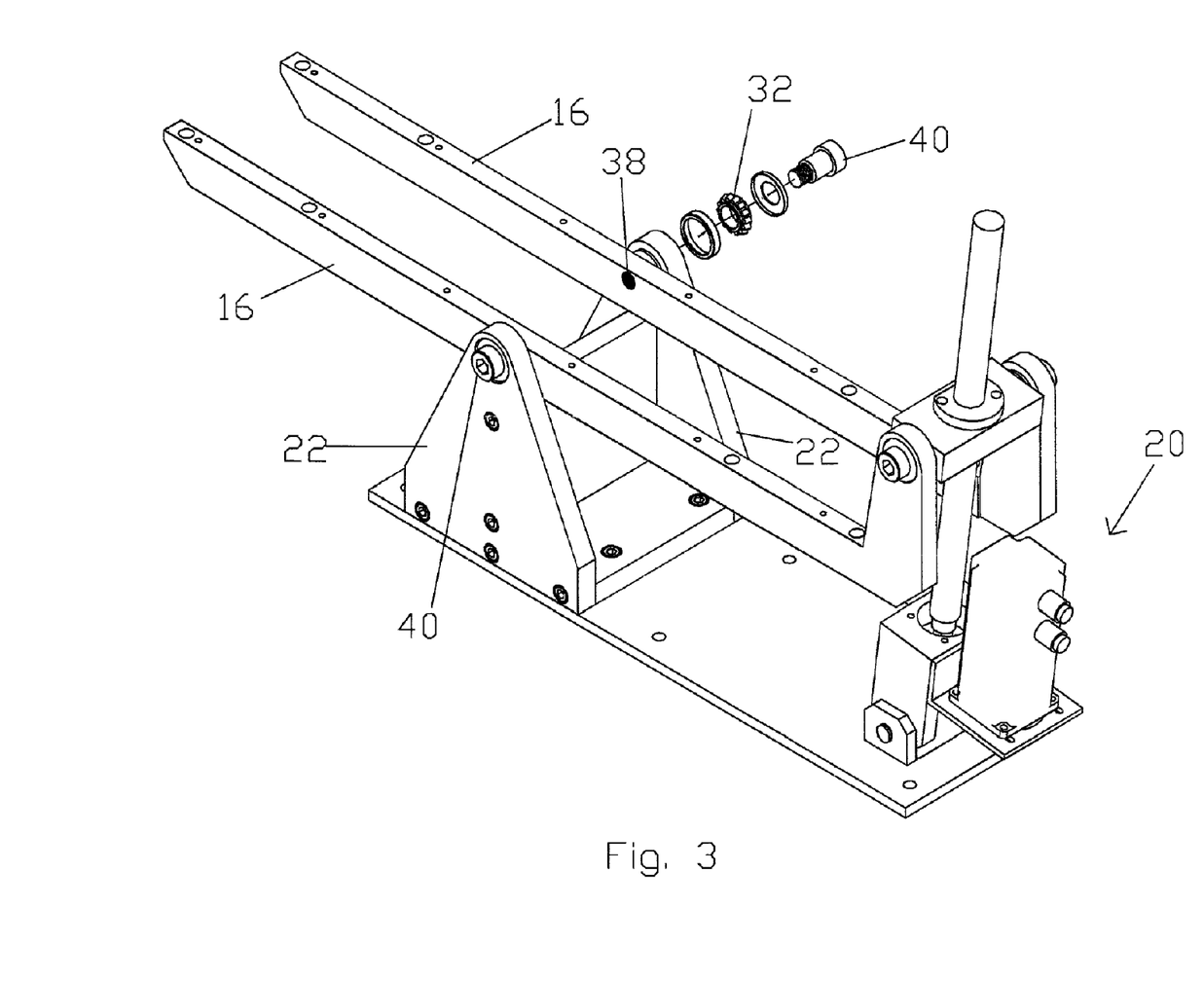
FIG. 3 is a perspective view of a tilt table according to the present invention.
Figure 4:
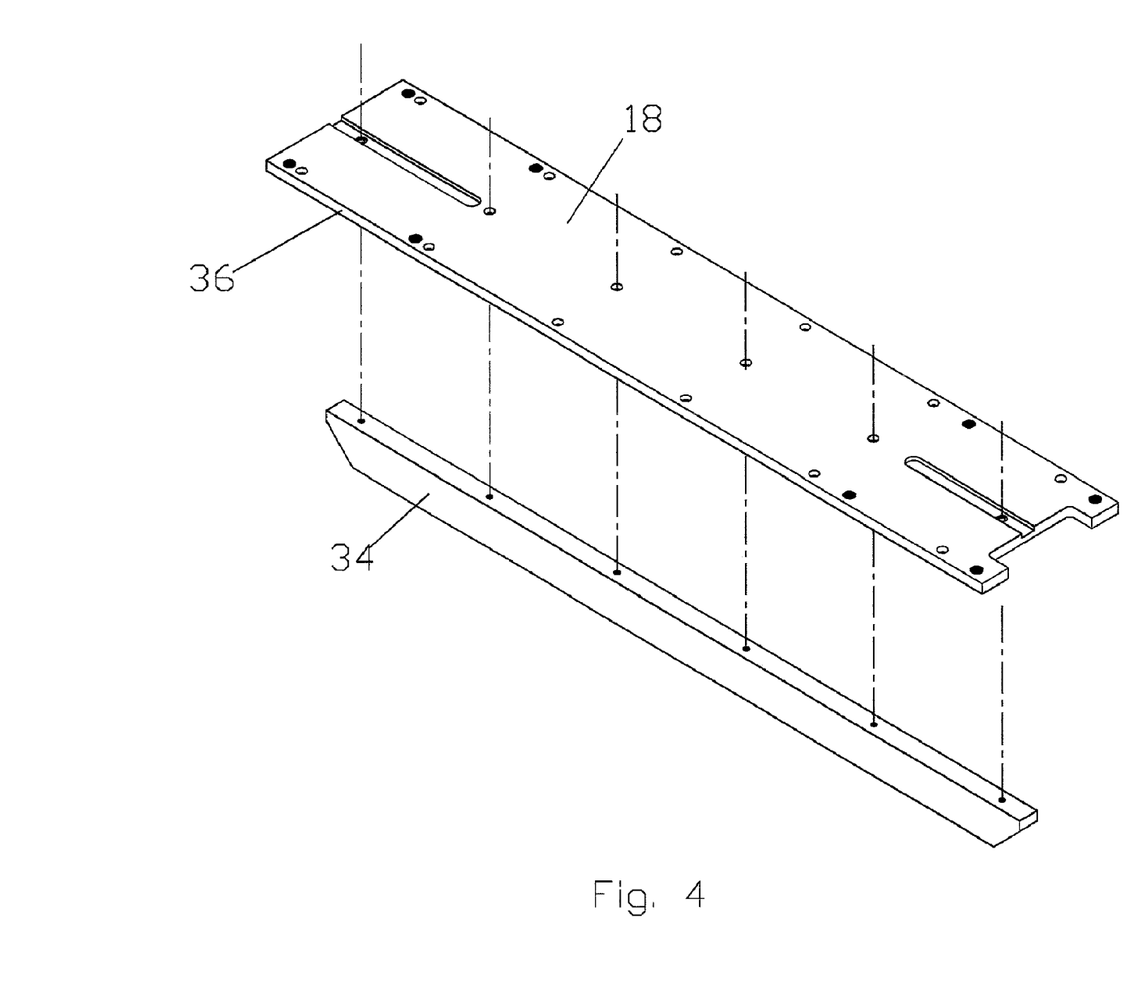
FIG. 4 is a perspective view of a table top according to the present invention.

The present invention is a tilt table 10, as shown in FIGS. 1-11. The tilt table 10 includes a main mounting plate 12, pivot assembly 14, table support beams 16, table top 18 and movement assembly 20. The main mounting plate 12 is used to mount the tilt table 10 to a milling machine. The other components of the tilt table 10 are mounted to the main mounting plate 12. The pivot assembly 14 includes two pivot supports 22 having a top 24 and a bottom 26. A horizontal cross brace 28 and vertical cross brace 30 are secured between the pivot supports 22. The horizontal cross brace 28 is mounted to the main mounting plate 12 and to the bottom of each pivot support 22. The vertical cross brace 30 is mounted along the each pivot support 22 between the top 24 and bottom 26 of each pivot support 22. Together, the horizontal cross brace 28 and vertical cross brace 30 are used to provide strength and support for the pivot supports 22 and to mount the pivot supports 22 to the main mounting plate 12. Each pivot support 22 includes a pivot bearing 32 at the top 24 of the pivot support 22. Two table support beams 16 are shown in FIG. 3. The table top 18 is mounted to the table support beams 16. FIG. 4 shows an auxiliary beam 34 which is mounted to a bottom 36 of the table top 18 to provide additional strength to the table top 18. The two table support beams 16 each include a threaded pivot hole 38 to receive a bolt 40. The table support beams 16 are rotatably secured to the pivot supports 22 by running the bolt 40 through the pivot bearing 32 and threading the bolt 40 into the threaded pivot hole 38.

Figure 5:
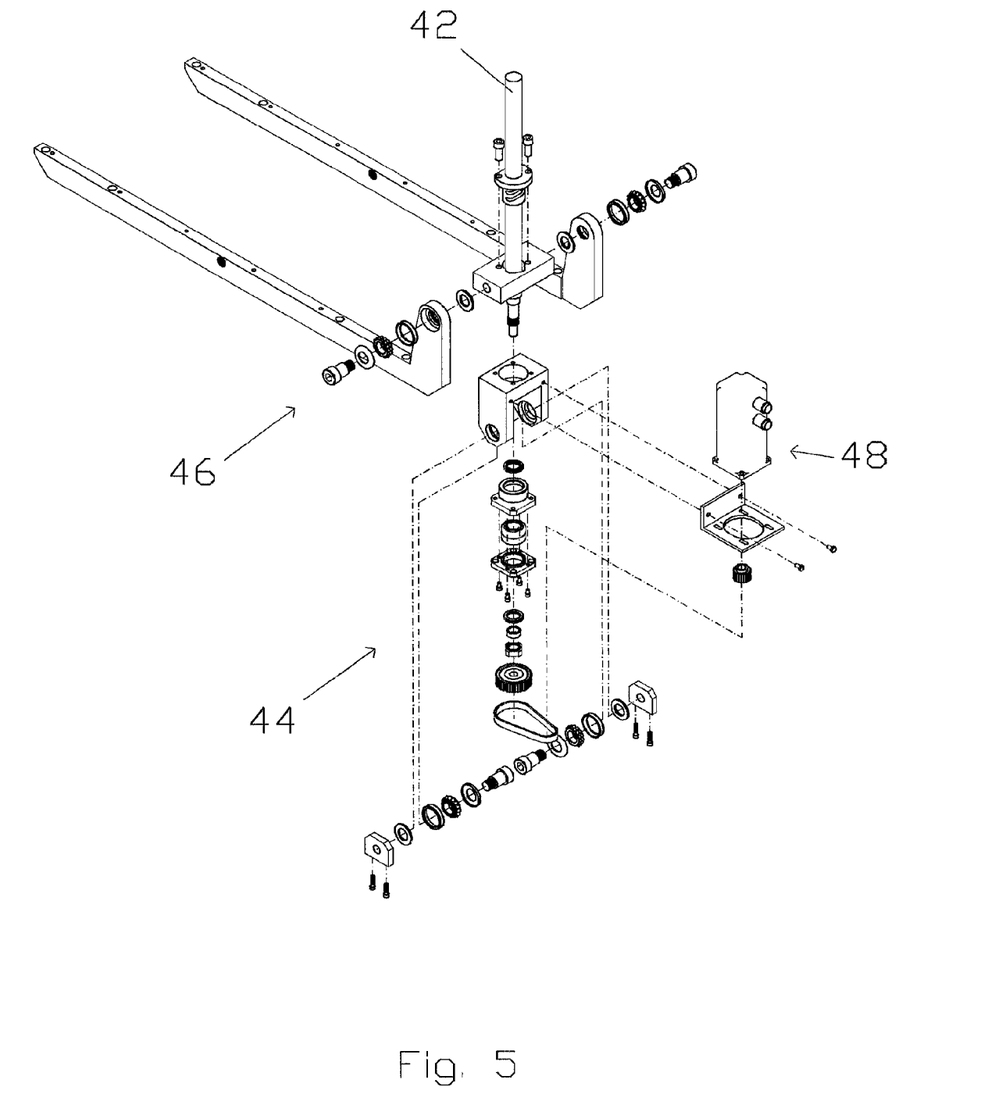
FIG. 5 a perspective exploded view of a tilt table according to the present invention.
Figure 6:
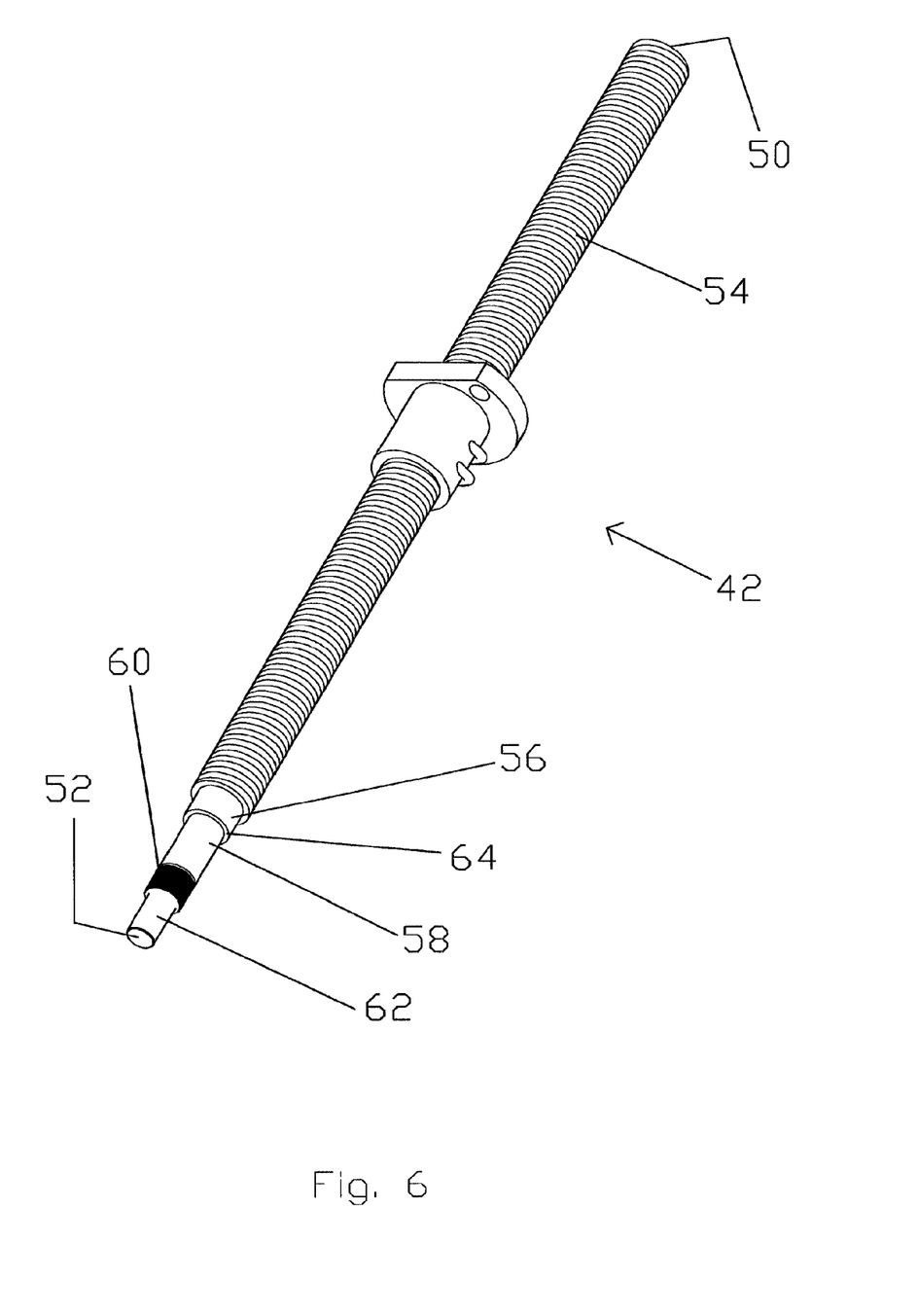
FIG. 6 a perspective view of a ball screw according to the present invention.

The tilt table 10 uses the movement assembly 20 at one or both ends of the tilt table 10 to control the angle of the table top 18. FIGS. 1-11 depict using one movement assembly 20, but there could be a movement assembly 20 at each end of the tilt table 10. Placing the movement assembly 20 at the end of the tilt table 10 instead of the center, allows the movement assembly 20 to bear the stress of machining and provides improved stability. The movement assembly 20 includes a ball screw 42, ball screw bearing support assembly 44, ball nut assembly 46, and ball screw drive assembly 48, as shown in FIG. 5. The ball screw 42 is a rod shape and includes a top end 50 and a bottom end 52, as shown in FIG. 6. From the top end 50 of the ball screw 42 down is a large threaded section 54, flange section 56, bearing section 58, a small threaded section 60 and pulley section 62. The flange section 56 includes a contact surface 64 to support the ball screw 42.

Figure 7:
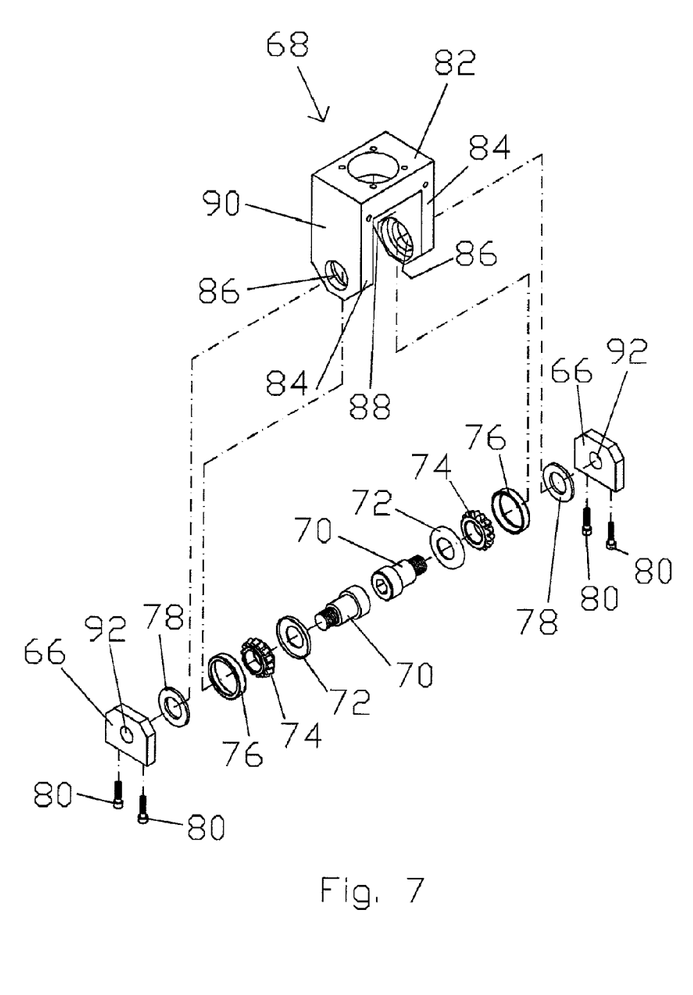
FIG. 7 a perspective exploded partial view of a ball screw bearing support assembly according to the present invention.

The ball screw bearing support assembly 44 includes mounting tabs 66, bearing yoke 68, shoulder bolts 70, bearing covers 72, tapered roller bearings 74, bearing races 76, thrust washers 78, and mounting tab bolts 80, as shown in FIG. 7. The bearing yoke 68 includes a top plate 82 with two legs 84 extending downward forming a U-shape. The legs 84 each include bearing holes 86 which are milled out on the inside 88 of the legs 84 as compared to the outside 90 of the legs 84 to receive the tapered roller bearings 74. The mounting tabs 66 are secured to the table top 18 using the mounting tab bolts 80. The table top 18 is not shown in FIG. 7, but would have holes that align with threaded holes in the bottom of the mounting tabs 66, also not shown. Each mounting tab 66 includes a bearing yoke mounting hole 92 which is threaded. The bearing yoke 68 fits between the mounting tabs 66, such that the bearing holes 86 of the bearing yoke 68 align with the bearing yoke mounting holes 92 of the mounting tabs 66. The thrust washers 78 are fitted between the legs 84 of the bearing yoke 68 and the mounting tabs 66 at the bearing holes 86 and bearing yoke mounting holes 92. A bearing race 76 is fitted into each bearing hole 86 of the bearing yoke 68 from the inside. A tapered roller bearing 74 is fitted into each bearing hole 86 of the bearing yoke 68 and against the bearing race 76. A bearing cover 72 is fitted into each bearing hole 86 of the bearing yoke 86 and against the tapered roller bearing 74. A shoulder bolt 70 is fitted into the bearing cover 72, tapered roller bearing 74, bearing race 76 and thrust washer 78 and then threaded into the threaded bearing yoke mounting hole 92 of each mounting tab 66. The shoulder bolt 70 secures the bearing yoke 68 between the mounting tabs 66. The combination of the bearing covers 72, tapered roller bearings 74, bearing races 76 and thrust washers 78 allows the bearing yoke 68 to rotate about the mounting tabs 66.

Figure 8:
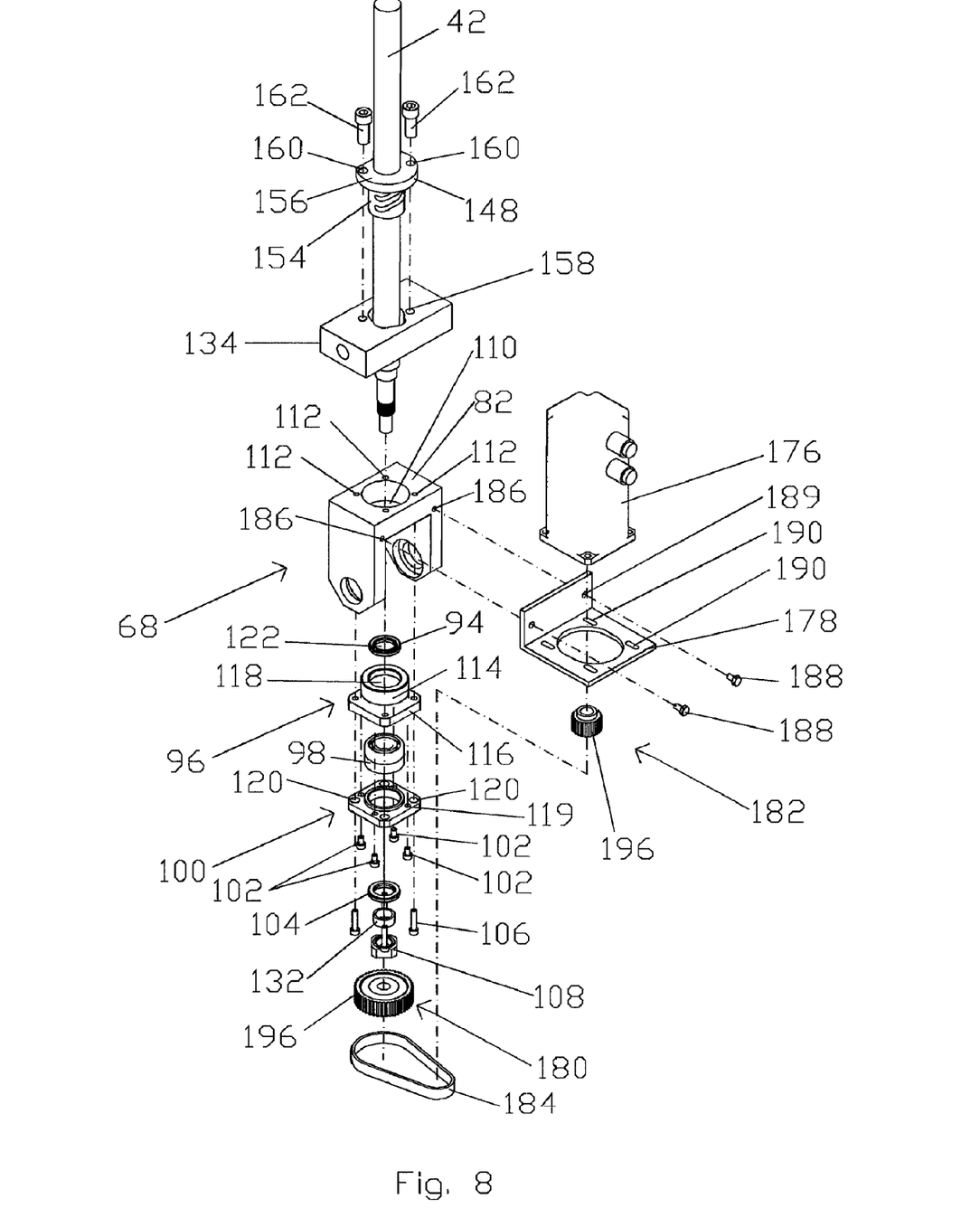
FIG. 8 a perspective exploded partial view of a ball screw bearing support assembly according to the present invention.
Figure 9:
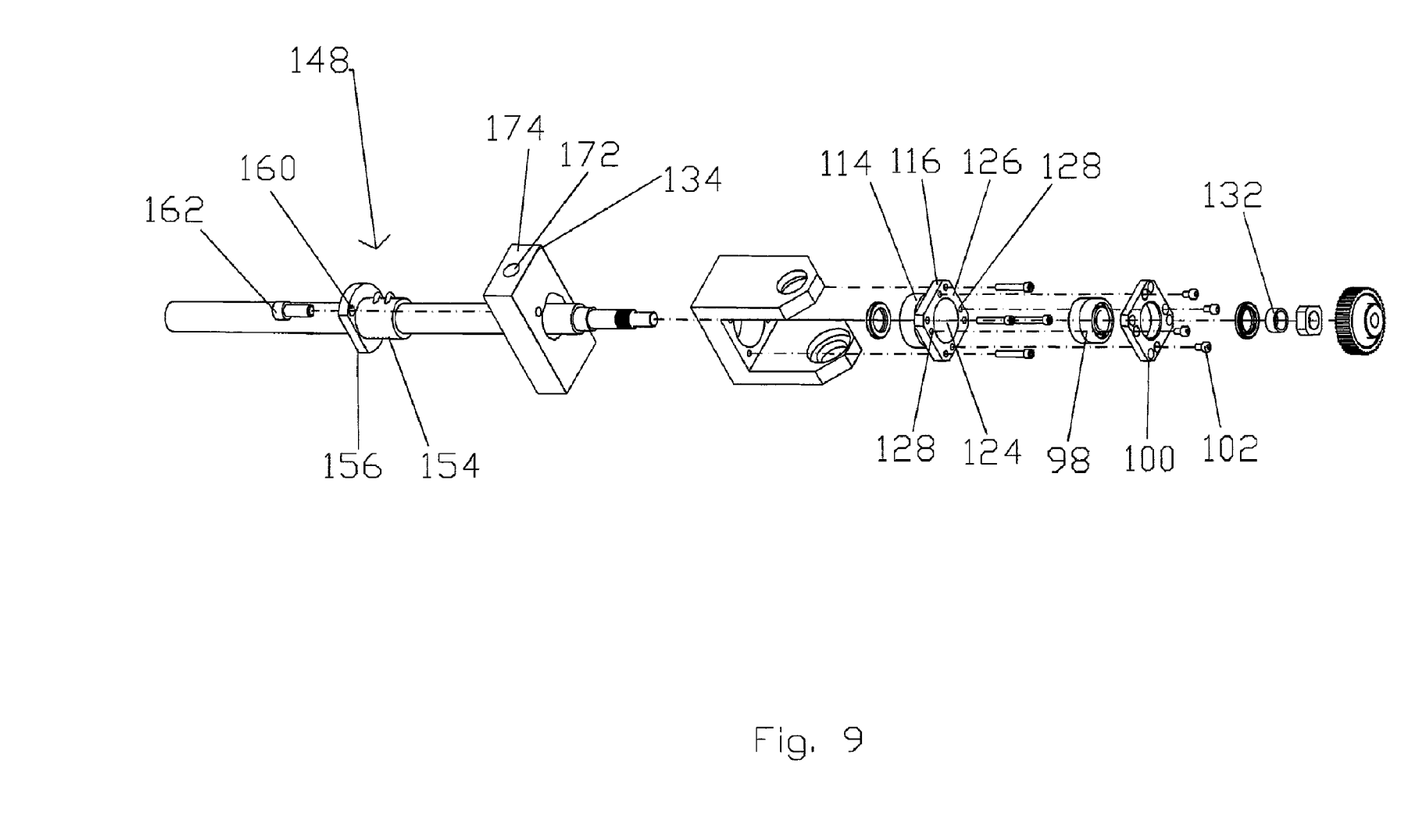
FIG. 9 a perspective exploded partial view of a ball screw bearing support assembly according to the present invention.

The ball screw bearing support assembly 44 also includes a top seal 94, bearing housing 96, ball screw support bearings 98, bearing housing end plate 100, bearing housing bolts 102, bottom seal 104, bearing yoke bolts 106 and ball screw tensioning nut 108 which all attached to the bearing yoke 68, as shown in FIGS. 8-9. The top plate 82 of the bearing yoke 68 includes a bearing housing hole 110 with threaded bolt holes 112 around the bearing housing hole 110. The bearing housing 96 is shown as a shank 114 with contact plate 116. The shank 114 includes a through hole 118 which continues through the contact plate 116 to receive the bottom end 52 of the ball screw 42. The shank 114 fits into the bearing housing hole 110 of the top plate 82 of the bearing yoke 68. The contact plate 116 includes bolt holes 120 which match the pattern of the threaded bolt holes 112 of the bearing yoke 68. The top seal 94 is positioned above the shank 114 and includes a hole 122 to receive the flange section 56 of the ball screw 42. The bearing housing 96 includes an enlarged hole 124 within the shank 114 from the bottom 126 of the contact plate 116 to receive the ball screw support bearings 98, as shown in FIG. 9. The contact surface 64 of flange section 56 of the ball screw 42 rests on the ball screw support bearings 98. The bearing housing end plate 100 includes holes 119. The bearing housing end plate 100 fastens to the bottom 126 of the contact plate 116 using bearing housing bolts 102 inserted into holes 119 and threaded into threaded bearing housing holes 128 of the contact plate 116 to secure the ball screw support bearings 98 in the bearing housing 96, as shown in FIG. 9. The bearing section 58 of the ball screw 42 resides in the ball screw support bearings 98 with some of the bearing section 58 and the small threaded section 60 extending downward from the bearing housing end plate 100. The bottom seal 104 mounts over the bottom end 52 of the ball screw 42 and against the bearing housing end plate 100. A spacer 132 mounts over the bottom end 52 of the ball screw 42 and against the bottom seal 104. The ball screw tensioning nut 108 threads onto the small threaded section 60 with enough tension to secure the ball screw 42 to the bearing yoke 68, yet allow the ball screw 42 to rotate within the bearing yoke 68 due to the ball screw support bearings 98.

Figure 10:
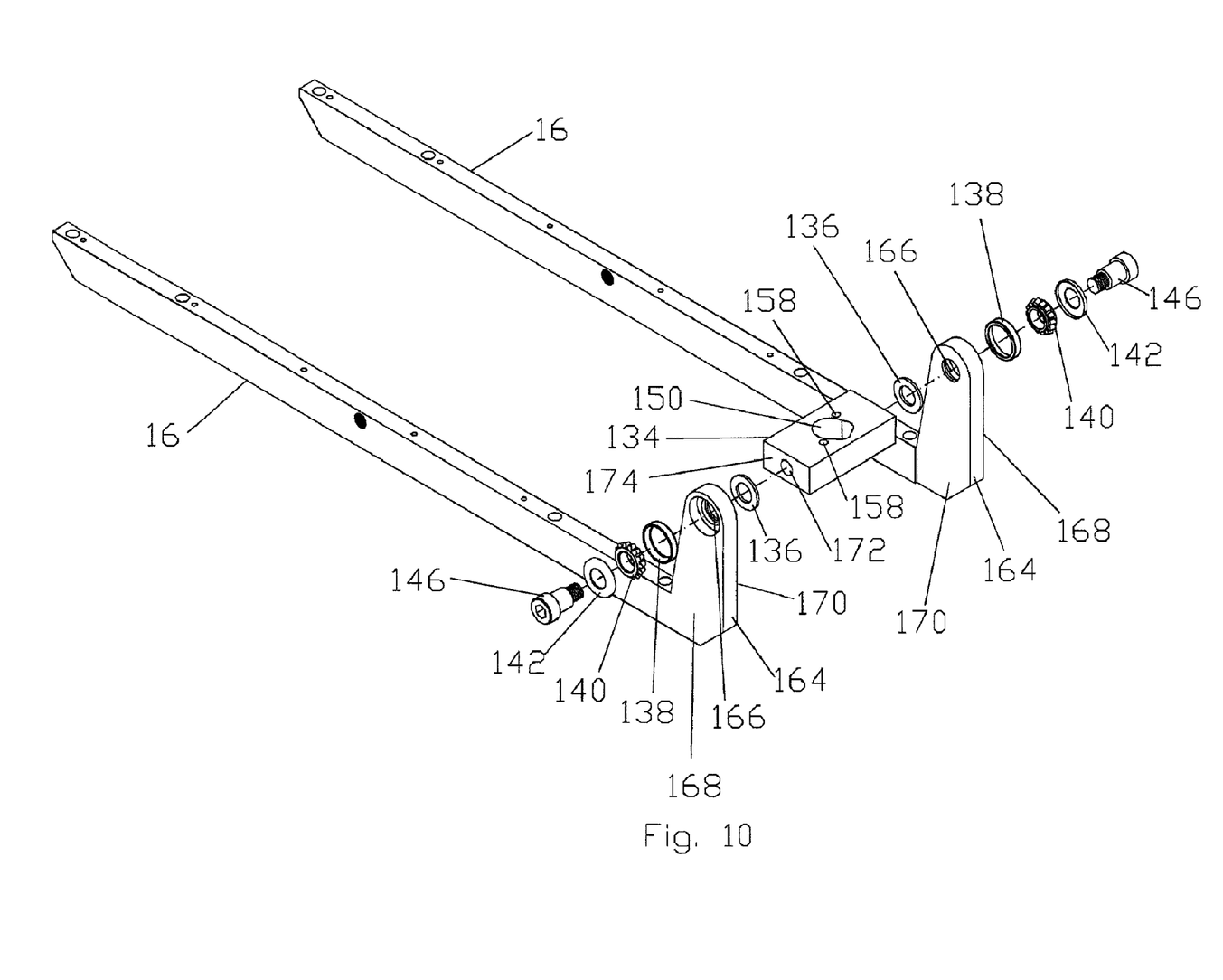
FIG. 10 is a perspective exploded partial view of a ball nut assembly according to the present invention.

The ball nut assembly 46 includes a ball nut mount 134, thrust washers 136, bearing races 138, tapered roller bearings 140, bearing covers 142 and shoulder bolts 146, as shown in FIG. 10. The ball nut assembly also includes a ball nut 148, as shown in FIGS. 8-9. The ball nut mount 134 includes a ball nut hole 150, ball nut mounting holes 158 and threaded shoulder bolt holes 172. The ball nut 148 includes a shank 154 and a mounting plate 156. The shank 154 includes internal threads (not shown) to engage the large threaded section 54 of the ball screw 42. The shank 154 fits into the ball nut hole 150 of the ball nut mount 134. The ball nut mount 134 includes two threaded bolt holes 158 and mounting plate 156 of the ball nut 148 includes two bolt holes 160. The threaded bolt holes 158 of the ball nut mount 134 and the bolt holes 160 of the ball nut 148 align with each other to secure the ball nut 148 to the ball nut mount 134 using bolts 162. FIG. 10 shows the table support beams 16 including rotation arms 164. Each rotation arm 164 includes a bearing hole 166, which are milled out on the outside 168 of the rotation arms 164 as compared to the inside 170 of the rotation arms 164 to receive the tapered roller bearings 140. The ball nut mount 134 is mounted between the insides 170 of the rotation arms 164. The ball nut mount 134 includes threaded shoulder bolt holes 172 in each side 174 which faces the rotation arms 164. A thrust washer 136 is fitted between each side 174 of the ball nut mount 134 and each rotation arm 164 in the area of the bearing hole 166 of the rotation arm 164. A bearing race 138 is fitted into each bearing hole 166 of the rotation arm 164 from the outside 168. A tapered roller bearing 140 is fitted into each bearing hole 166 of the rotation arm 164 and against the bearing race 138. A bearing cover 142 is fitted into each bearing hole 166 of the rotation arm 164 and against the tapered roller bearing 140. A shoulder bolt 146 is fitted into the bearing cover 142, tapered roller bearing 140, bearing race 138 and thrust washer 136, and then threaded into the threaded bolt hole 172 in the side 174 of the ball nut mount 134. The shoulder bolt 146 secures the ball nut mount 134 between to the rotation arms 164. The combination of the bearing covers 142, tapered roller bearings 140, bearing races 138 and thrust washers 136 allows the ball nut mount 134 to rotate between the rotation arms 164.

Figure 11:
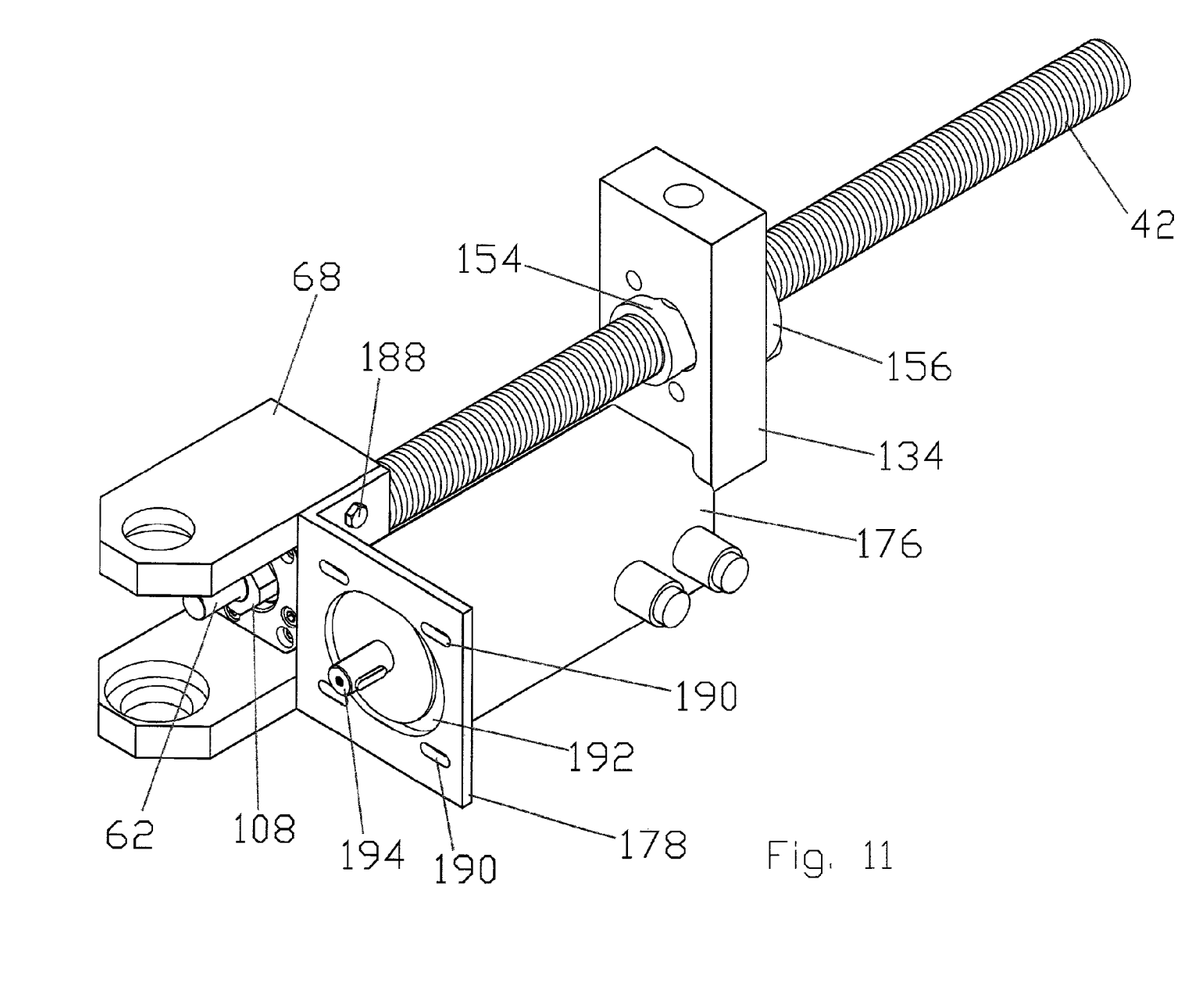
FIG. 11 is a perspective partial view of a ball screw drive assembly according to the present invention.
Figure 12:
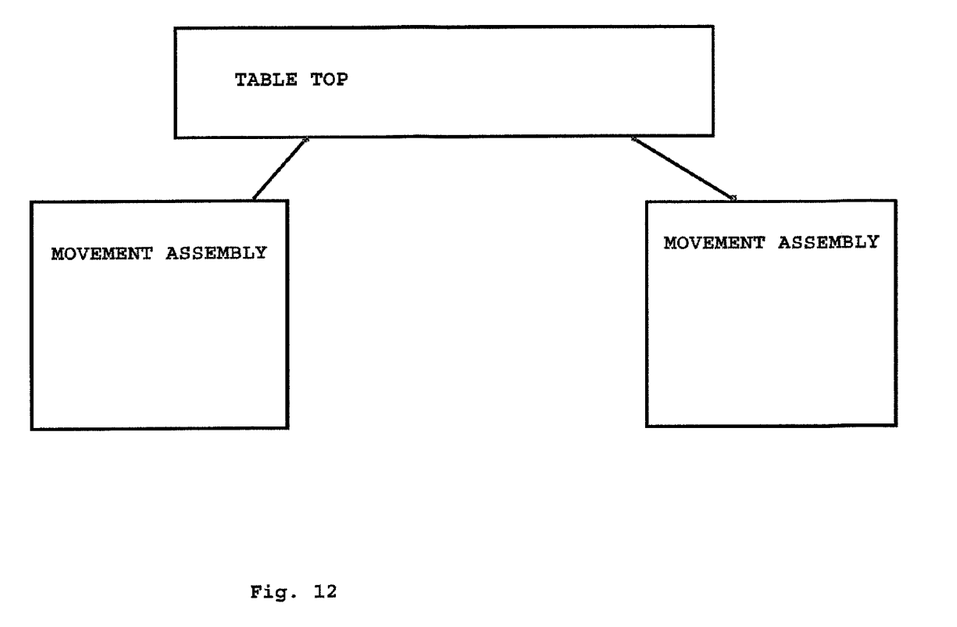
FIG. 12 is a schematic representation of a tilt table having two movement assemblies.

The ball screw drive assembly 48 includes a motor 176, motor mount 178, motor gear pulley 182, ball screw gear pulley 180 and a timing belt 184, as shown in FIGS. 5 and 11. The bearing yoke 68 includes motor mount bolt holes 186. The motor mount 178 is mounted to the bearing yoke 68 using the motor mount bolt holes 186 and motor mount bolts 188 with bolt holes 189 in the motor mount 178. The motor 176 mounts to the motor mount 178 using slotted holes 190 in the motor mount 178, whereby the slotted holes 190 allow adjustment for belt tensioning. The motor 176 can be mounted using bolts and nuts (not shown). There is a shaft hole 192 in the motor mount 178 to allow the shaft 194 of the motor 176 to pass below the motor mount 178. The motor gear pulley 182 mounts to the motor shaft 194. The ball screw gear pulley 180 mounts to the pulley section 62 of the ball screw 42. The timing belt 184 mounts around the motor gear pulley 182 and the ball screw gear pulley 180. The timing belt 184 has teeth (not shown) to engage the teeth 196 of the both the motor gear pulley 182 and the ball screw gear pulley 180, so as to increase precision movement of the ball screw 42.

The operation of the tilt table 10 is as follows. The motor 176 is reversible and is usually controlled by a computer. The tilt table 10 works by commanding the motor 176 to rotate the motor gear pulley 182, which moves the timing belt 184. The rotating of the shaft 194 of the motor 176 rotates the motor gear pulley 182. Movement of the motor gear pulley 182 moves the timing belt 184, which causes the ball screw gear pulley 180 to rotate. The rotating ball screw gear pulley 180 causes the ball screw 42 to rotate. Rotation of the ball screw 42 moves the ball nut 148 up and down the ball screw 42, depending on the direction the shaft 194 of the motor 176 is rotating. The bearings and rotation points used with the pivot assembly 14 and the movement assembly 20 allow free movement of the table support beams 16 about the pivot assembly 14 to control the angle of the table top 18. The tapered roller bearings 74 at the mounting tabs 66 allow the bearing yoke 68 to adjust freely as the table top 18 is moved to various angles. The bearing yoke 68 serves as the mounting base for the ball screw 42 and allows the ball screw 42 to freely rotate in the clockwise or counterclockwise direction, due to the ball screw support bearings 98. The tapered roller bearings 140 in the rotation arms 164 allow the table support beams 16 and the table top 18 to tilt to the desired angle as the ball nut 148 threads up or down the ball screw 42 during rotation of the ball screw 42. The motor gear pulley 182 and ball screw gear pulley 180 allow the user of the tilt table 10 to adjust the speed to torque ratio of the tilt table 10 by choosing the proper sized motor gear pulley 182 and ball screw gear pulley 180 for a desired ratio. If an application requires very quick angle adjustments or if greater angular precision is required, the selection of the proper pulley ratio can be chosen to provide the desired results. Utilizing the ball screw 42 on the end of the tilt table 10 to control the angle of the table top 18 gives the user the flexibility to move the pivot point of the table top 18 to any location along the main mounting plate 12 by moving the pivot supports 22. The tilt table 10 also works in conjunction with other machining accessories, such as a rotary table mounted to the table top 18. The ball screw 42 and ball nut 148 combination provides improved machining precision, due to improved fixed positioning of the table top 18 and the resistance to wear and tear as compared to other tilt table angle control devices.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

What is claimed is:

1. A tilt table, for use with a milling machine to machine a part, comprising:
    at least one pivot support attachable to the milling machine;
    a table top having an upper surface, said table top pivotally attached to said at least one pivot support, said table top having a first end and a second end, said table top attached to said at least one pivot support between said first end and said second end such that there is a pivot point along said table top between said first end and said second end, said pivot point having an axis of rotation at said table top;
    one powered movement assembly attached to said first end of said table top to move said table top about said pivot point at said at least one pivot support, and configured such that when said one movement assembly pivots said table top in one direction, one of said first end and said second end moves upwardly while the other of said first end and said second end moves downwardly, said movement assembly being a separate entity from said least one pivot support and said pivot point, and configured such that said table top is arranged so as to indirectly connect said movement assembly to said at least one pivot support and to said pivot point, wherein said movement assembly includes a nut attached to said table top and a screw which threads into said nut, whereby rotation of said screw moves said nut up and down said screw and thereby moves said table top about said pivot point and wherein said screw extends through an imaginary plane containing said upper surface of said table top.

2. The tilt table of claim 1, wherein there is a second movement assembly attached to said second end of said table top to move said table top about said pivot point at said least one pivot support, said second movement assembly being a separate entity from said least one pivot support and said pivot point.

3. The tilt table of claim 1, wherein said nut is a ball nut; and said screw is a ball screw.

4. The tilt table of claim 3, wherein said movement assembly includes a motor attached to said ball screw to rotate said ball screw.

5. The tilt table of claim 4, wherein said movement assembly includes a ball screw pulley attached to said ball screw; wherein said movement assembly includes a motor pulley attached to said motor; and wherein said movement assembly includes a belt about said ball screw pulley and said motor pulley, so as to rotate said ball screw due to rotation of said motor pulley.

6. The tilt table of claim 5, wherein said ball screw pulley and said motor pulley include teeth; and wherein said belt includes teeth which engage said teeth of said ball screw pulley and said motor pulley.

7. The tilt table of claim 3, wherein said at least one pivot support includes two pivot supports attachable to the milling machine; and wherein said table top is pivotally attached between said two pivot supports.

8. The tilt table of claim 7, wherein said table top includes two support beams attached to said table top; and where each of said two support beams is pivotally attached to one of said two pivot supports.

9. The tilt table of claim 8, wherein each of said support beams includes a ball screw end; wherein a ball nut mount is rotatably connected between said ball screw ends of said support beams; and wherein said ball nut is attached to said ball nut mount.

10. The tilt table of claim 7, wherein said tilt table includes a main plate for attachment to the milling machine; and wherein said two pivot supports attach to said main plate.

11. The tilt table of claim 10, wherein said table top includes two support beams attached to said table top; and where each of said two support beams is pivotally attached to one of said two pivot supports.

12. The tilt table of claim 11, wherein each of said support beams includes a ball screw end; wherein a ball nut mount is rotatably connected between said ball screw ends of said support beams; and wherein said ball nut is attached to said ball nut mount.

13. The tilt table of claim 1, wherein said table top includes at least one support beam attached to said table top; and where said at least one support beam is pivotally attached to said at least one pivot support.

14. A tilt table, for use with a milling machine, comprising:
    at least one pivot support attachable to the milling machine;
    a table top pivotally attached to said at least one pivot support, said table top having two ends;
    at least one movement assembly attached to at least one end of said table top to move said table top about said at least one pivot support;
    said movement assembly including a ball nut attached to said table top;
    and a ball screw which threads into said ball nut, whereby rotation of said ball screw moves said ball nut up and down said ball screw and thereby moves said table top about said at least one pivot support;
    said at least one pivot support includes two pivot supports attachable to the milling machine and said table top is pivotally attached between said two pivot supports;

said table top includes two support beams attached to said table top and each of said two support beams is pivotally attached to one of said two pivot supports;

each of said support beams includes a ball screw end;

a ball nut mount rotatably connected between said ball screw ends of said support beams and said ball nut is attached to said ball nut mount; and said tilt table includes a ball screw bearing support rotatably attached to the milling machine to support a bottom end of said ball screw;

said bearing support is rotatably attached such that said bearing support and said bottom of said ball screw can move as necessary when said ball nut moves up and down said ball screw.

15. The tilt table of claim 14, wherein said movement assembly includes a motor attached to said ball screw to rotate said ball screw.

16. The tilt table of claim 15, wherein said movement assembly includes a ball screw pulley attached said bottom end of said ball screw; wherein said movement assembly includes a motor pulley attached to said motor; and wherein said movement assembly includes a belt about said ball screw pulley and said motor pulley, so as to rotate said ball screw due to rotation of said motor pulley.

17. A tilt table, for use with a milling machine, comprising:

at least one pivot support attachable to the milling machine;

a table top pivotally attached to said at least one pivot support, said table top having two ends;

at least one movement assembly attached to at least one end of said table top to move said table top about said at least one pivot support;

said movement assembly including a ball nut attached to said table top;

and a ball screw which threads into said ball nut, whereby rotation of said ball screw moves said ball nut up and down said ball screw and thereby moves said table top about said at least one pivot support;

said at least one pivot support includes two pivot supports attachable to the milling machine and said table top is pivotally attached between said two pivot supports;

said tilt table including a main plate for attachment to the milling machine and said two pivot supports attach to said main plate;

said table top including two support beams attached to said table top and where each of said two support beams is pivotally attached to one of said two pivot supports;

each of said support beams includes a ball screw end;

a ball nut mount is rotatably connected between said ball screw ends of said support beams; and wherein said ball nut is attached to said ball nut mount;

said tilt table includes a ball screw bearing support rotatably attached to said main plate to support a bottom end of said ball screw; and said bearing support is rotatably attached to said main plate such that said bearing support and said bottom of said ball screw can move as necessary when said ball nut moves up and down said ball screw.

18. The tilt table of claim 17, wherein said movement assembly includes a motor attached to said ball screw to rotate said ball screw.

19. The tilt table of claim 18, wherein said movement assembly includes a ball screw pulley attached said bottom end of said ball screw; wherein said movement assembly includes a motor pulley attached to said motor; and wherein said movement assembly includes a belt about said ball screw pulley and said motor pulley, so as to rotate said ball screw due to rotation of said motor pulley.

\* \* \* \* \*